Sept. 8, 1936. K. L. CURTIS Re. 20,095
METHOD OF AND APPARATUS FOR FEEDING OR PULLING TAPE
Original Filed April 5, 1930 2 Sheets-Sheet 1
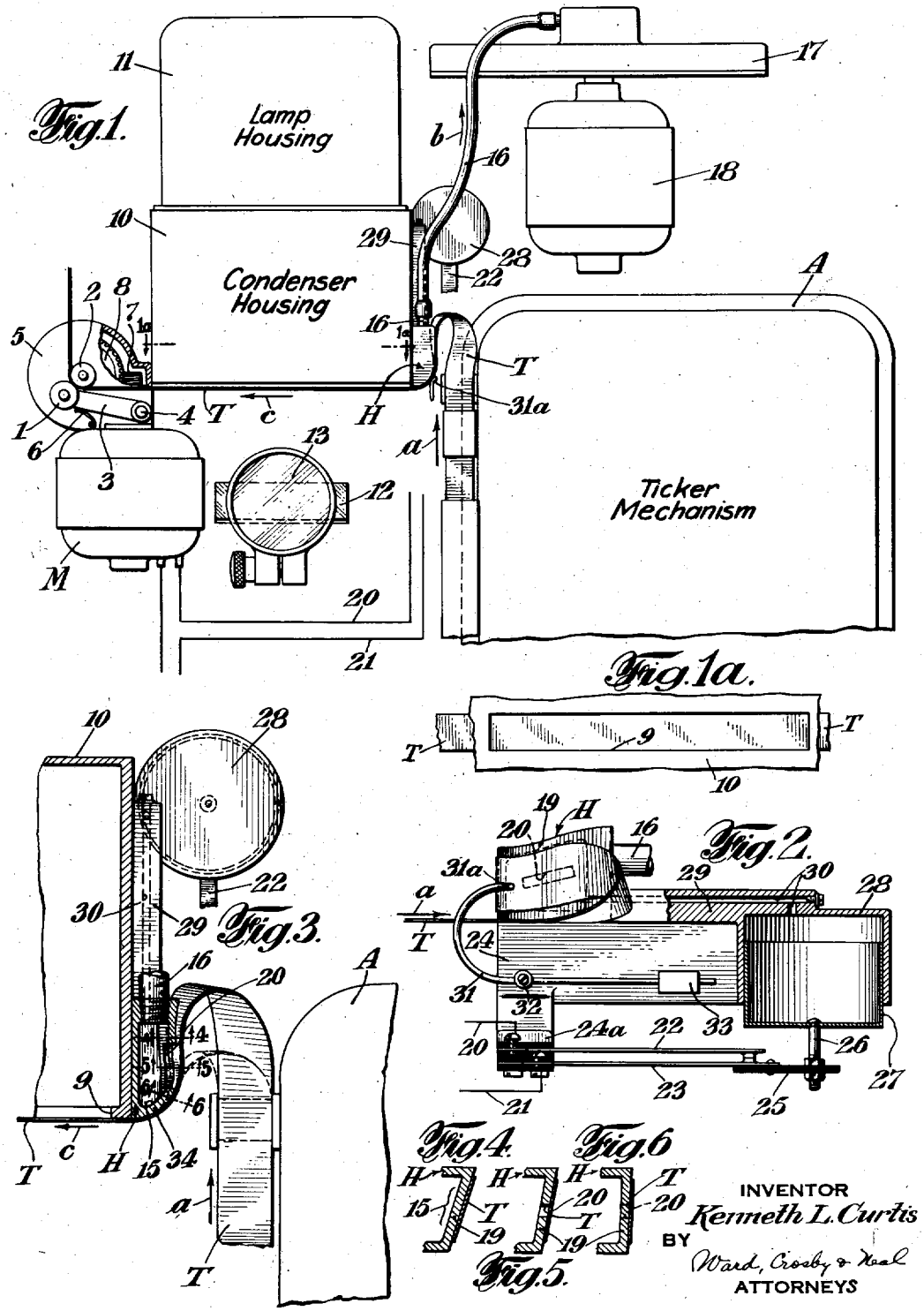
INVENTOR
Kenneth L. Curtis
BY
Ward, Crosby & Neal
ATTORNEYS

METHOD OF AND APPARATUS FOR FEEDING OR PULLING TAPE

Original Filed April 5, 1930 2 Sheets-Sheet 2

INVENTOR
Kenneth L. Curtis
BY
Ward, Crosby & Neal
ATTORNEYS

Reissued Sept. 8, 1936

Re. 20,095

UNITED STATES PATENT OFFICE 20,095

METHOD OF AND APPARATUS FOR FEEDING OR PULLING TAPE

Kenneth L. Curtis, New York, N. Y., assignor to Trans-Lux Daylight Picture Screen Corporation, New York, N. Y., a corporation of Delaware Original No. 1,908,960, dated May 16, 1933, Serial No. 441,963, April 5, 1930. Application for reissue November 9, 1935, Serial No. 49,042

16 Claims. (Cl. 178—42)

My invention relates to a tape-pulling system and involves a method of and apparatus for pulling tape along a path which extends, for example, through a projection field.

My invention, among other prominent features, involves a tape-pulling system controlled by or responsive to the control effected by the tape upon suitable mechanism.

My invention also relates to air-pressure control mechanism actuated in a novel manner by the tape after passage thereof from suitable printing mechanism.

Various other objects, advantages and characteristics of my invention will become apparent from the following description taken in connection with the accompanying drawings.

My invention resides in the method, apparatus, system, features of construction, and combinations of parts of the character hereinafter described and claimed.

For an understanding of my method and for an illustration of some of the many forms of my apparatus, reference is to be had to the accompanying drawings, in which:

Figure 1 is a plan view, partly broken away, and diagrammatically showing one form of a tape-pulling system as constructed in accordance with my invention;

Figure 1*a* is a vertical sectional view, partly in elevation, and is taken on the line 1*a*—1*a* of Fig. 1 looking in the direction of the arrows;

Fig. 2 is an enlarged vertical sectional view, partly in elevation, of a part of the control mechanism of Fig. 1;

Fig. 3 is an enlarged fragmentary view, partly in horizontal section, of a part of the mechanism shown in Fig. 1;

Figure 7:
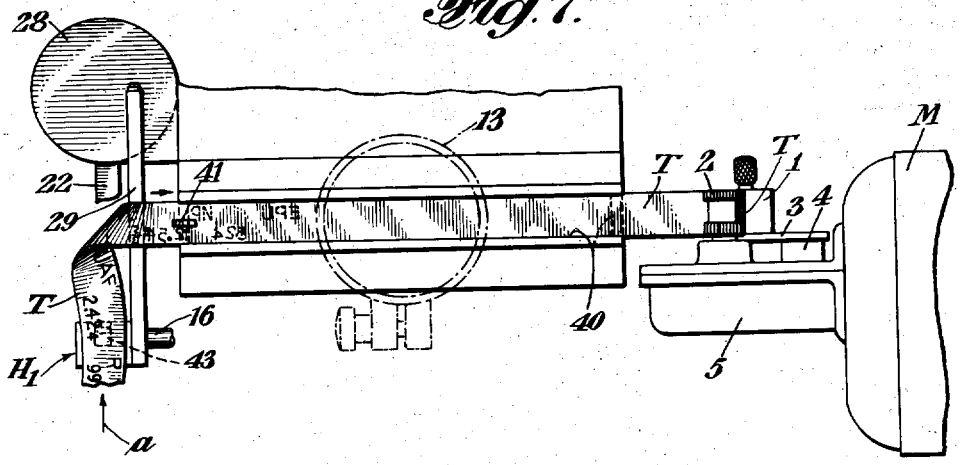
Figure 8:
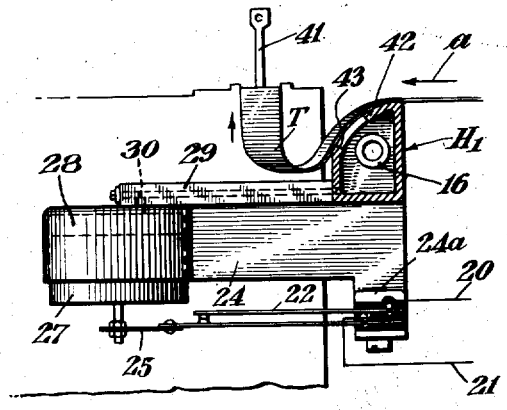

Figs. 4, 5 and 6 are vertical sectional views taken, respectively, on the lines 4—4, 5—5 and 6—6 of Fig. 3;

Fig. 7 is a plan view showing another form of a tape-pulling system as constructed in accordance with my invention; and Fig. 8 is a transverse, vertical sectional view, partly in elevation, of a part of the mechanism shown in Fig. 7.

Referring to Figs. 1 and 3, A represents suitable printing mechanism such, for example, as typewriter mechanism having individual keys, stock ticker mechanism of a character well known to the art and more particularly such as the high speed ticker mechanism now coming into use, such stock ticker mechanisms having rotatable printing wheels. As is well understood, ticker or typewriting mechanisms of the character stated print characters indicative of stock quotations on a tape T, the printed tape, in a pulsating manner, passing from the printing mechanism A in the direction of the arrows *a*, Figs. 1 and 3. In the appended claims, the term "ticker mechanism" shall be understood as generically comprehending or including typewriter mechanism, stock ticker mechanisms, as aforesaid, and the like.

To the end that the tape T may be pulled or moved through a projection field or zone where a projecting light beam coacts therewith, rollers 1 and 2 are shown as coacting with said tape T. As herein illustrated, the roller 1 is of the idler type and it may be rotatably mounted at one end of an arm 3 pivoted at 4 on a suitable support which, as hereinafter described, may be a gear housing 5. For biasing the roller 1 toward the roller 2, there may be utilized a spring 6 which may be mounted on said gear housing 5 and coacts with the arm 3 to bias the same in a clockwise direction, Fig. 1.

The roller 2 may be rotated in any suitable manner and by any suitable mechanism. As herein shown, a motor M is utilized for this purpose, the motor armature rotating a worm gear 7 which meshes with and drives a gear 8 to which is connected a shaft carrying the aforesaid roller 2. The gears 7 and 8 are mounted in the gear housing 5 and, by said gears, the rotative speed of the tape-pulling roller 2 is suitably reduced compared to the rotative speed of the armature of motor M.

As herein illustrated although not necessarily, the aforesaid projection field or zone is constituted by an aperture 9, Fig. 1*a*, at the front of a condenser housing 10 into which light passes from a suitable source of light disposed within a lamp housing 11. As may be determined from Figs. 1 and 1*a*, the projecting beam of light traverses that section of the tape T framed by the aperture 9 and then passes into coacting relation with a mirror 12 from which said light beam passes to and through an objective or projection lens 13 whereby images of the tape characters are obtained on any suitable screen, not shown.

It is well understood in the art that tape having stock quotation characters printed thereon issues from the ticker mechanism in a pulsating manner and more particularly in an irregular pulsating manner at times. In contradistinction to this pulsating movement of the tape, the latter should pass through the projection field or zone in a regular or even manner even though, at times, there may be a temporary cessation of tape movement through said field or zone, the latter arising, ordinarily, because of temporary discontinuation of the ticker mechanism.

In accordance with my invention, operation of the tape-pulling mechanism, herein shown as the motor M, is controlled in a novel manner by the tape T soon after the latter leaves the ticker mechanism A. To this end and as shown in Figs. 1–6 which illustrate a preferred arrangement, there may be utilized a housing H forming an air chamber 15 from which air is drawn in any suitable manner such, for example, as through a conduit 16 opening into the inlet side of a housing 17 containing suitable fan structure, not shown, the latter being operated by a motor 18, or the like, whereby air is drawn through the conduit 16 in the direction of the arrow *b*, Fig. 1.

The housing H has a wall 19, the exterior surface of which the tape T, to more or less extent, is adapted to engage as it passes toward the aforesaid projection field. The wall 19 has a perforation or slot 20 through which, by the motor 18, air may be drawn into the chamber 15 from the atmosphere provided that said slot 20 is not closed or substantially closed by an adjacent section of the tape T. In accordance with my invention, operation of the tape-pulling motor M continues so long as air, to any substantial extent, is prevented from passing through the slot 20 by an adjacent section of the tape T whereas, when said slot 20 is more or less open, operation of said tape-pulling motor M is discontinued.

The mechanism for thus controlling operation of the tape-pulling motor M may be of any suitable character. For this purpose and as herein illustrated, conductors 20 and 21, in which a suitable source of current, not shown, is included, lead from the respective motor terminals to contact members 22 and 23, respectively, of suitable switching mechanism. The contact members 22 and 23 may be carried, in suitable insulated relation, by a lateral arm 24*a* of a member 24, Fig. 2.

For maintaining the contact members 22 and 23 closed as shown in Fig. 2 or for holding said contact members open, one of them, as the contact member 23, may carry an insulating member 25 connected by a member 26 with a plunger or piston 27 slidably disposed, in suitable sealed relation, in a cylinder or housing 28. Extending between the cylinder 28 and the aforesaid housing H is a member 29 having a passage 30 placing said cylinder and housing in communicating relation.

Preferably but not necessarily, the housing H, member 24, cylinder 28 and member 29 may be integrally formed with each other, as by a casting process, and the structure thus produced may be secured to the side of the condenser housing 10 as shown in Figs. 1 and 3; however, if desired, said structure may be disposed or mounted in any other suitable manner.

When the air pressure conditions on both sides of the piston 27 are substantially balanced, the latter remains in a position lower than the one shown in Fig. 2 and sufficiently lower to cause the contacts of contact members 22 and 23 to be separated, the contact member 23 supporting piston 27 in said lower position.

As shown in Fig. 1, the tape section with which the projecting light beam coacts at any given time extends horizontally and is disposed edgewise, i. e., perpendicular to the plane of the sheet on which the drawing is made. Said tape section is maintained in this position by the rollers 1 and 2 in conjunction with the curved end 31*a* of a lever 31 pivoted at 32 on the aforesaid member 24, the lever 31 being suitably biased in a clockwise direction, Fig. 2, as by weight 33 carried thereby. Due to the weight 33, the lever end 31*a* retains the adjacent surface of the tape T in engagement with the nose 34 of the housing H under pressure conditions sufficient to insure the requisite tautness of the tape section extending to the rollers 1 and 2 but insufficient to impede movement of the tape, under the influence of said rollers, to an undesired or unwarranted extent.

As clearly appears from Figs. 1 and 3, the longitudinal axis of the tape path through the projection field is disposed at right angles to the path taken by the tape as it leaves the ticker mechanism. This is desirable but not necessary and may be varied, if desired, by positioning the ticker mechanism A in such different position that the aforesaid right angular relation does not exist. The tape T, as it leaves the ticker mechanism A, travels first in the direction of the arrows *a*, Figs. 1, 2 and 3, flatwise and in a horizontal direction. Due to the fact that an advanced tape section is held, by the lever end 31*a*, in vertical edgewise position, it results that the tape T, after leaving the printing wheel of the ticker mechanism A, turns or twists through an angle of ninety degrees in a gradual or progressive manner.

Assuming that a tape loop such as shown by the full lines of Fig. 3 has been formed between the ticker mechanism and the lever end 31*a*, it will be obvious that the tape section immediately adjacent the wall 19 of housing H will have come nearly to vertical edgewise position and that this relation to greater and greater extent obtains as the lever end 31*a* is approached.

In accordance with my invention, the configuration of the exterior surface of wall 19 is shaped substantially the same as the configuration of the aforesaid last named tape section. This clearly appears from a consideration of Figs. 4, 5 and 6 which show the progressive way in which said tape section approaches a true vertical edgewise relation as the lever end 31*a* is approached and which also show the corresponding shape of the wall 19 at different sections thereof.

Assuming that the tape T is held in the projection field or zone by the rollers 1 and 2 in conjunction with the lever end 31*a* as shown in Fig. 1, that the tape loop between the ticker mechanism A and said lever end 31*a* is as illustrated by the broken lines in Fig. 3, and that the motor 18 is operating to draw air through the conduit 16 in the direction of the arrow *b*, Fig. 1, the operation is as follows:

With the aforesaid tape loop occupying a position substantially as shown by the broken lines of Fig. 3, the slot 20 is uncovered and, therefore, air from the atmosphere passes through said slot 20, into the chamber 15, through the conduit 16 and then is exhausted to the atmosphere from the fan housing 17. During constinuance of such a condition, the air pressure on both sides of piston 27 is substantially equal and, therefore, the latter is in a position lower than the one shown in Fig. 2 whereby the circuit of motor M is open at the switch contacts of contact members 22 and 23. Accordingly, at this time, the motor M is not in operation and a section of the tape T remains stationary in the projection field.

The aforesaid condition obtains until, by operation of the ticker mechanism A, sufficent tape T is ejected therefrom to form a tape loop substantially as illustrated in Figs. 1 and 2 and by the full lines of Fig. 3. During progressive formation of such a loop, it results that the slot 20, to greater and greater extent, is covered or closed by the adjacent tape section. Eventually, as said slot 20 is substantially or entirely closed, passage of air therethrough from the atmosphere is substantially or entirely prevented. As a result, the motor 18, by action of the fan in housing 17, causes the immediate development of a partial vacuum in the chamber 15, this partial vacuum also obtaining in the conduit 30, cylinder 28 and interiorly of piston 27. Due to the unbalanced air pressure condition thus set up on piston 27, the latter moves upwardly to the position shown in Fig. 2 to thereby close the switch contacts of contact members 22 and 23, whereby the circuit of motor M is closed and the tape-pulling roller 2 is actuated to pull or move the tape in a regular or even manner across the projection field or through the projection zone in the direction of the arrow *c*, Figs. 1 and 3.

As long as the tape T is ejected from the ticker mechanism A at substantially the rate at which it is moved by the pulling roller 2, the slot 20 remains covered and the motor M remains in operation. However, should operation of the ticker mechanism A be temporarily discontinued or should said ticker mechanism operate at a slower rate, comparatively speaking, the more rapid operation of the tape-pulling roller 2 causes reduction in size of the tape loop between the ticker mechanism A and lever end 31*a* and, if this reduction in size continues to a sufficient extent, the slot 20 will be uncovered to permit passage of air therethrough from the atmosphere in the manner described above. When this happens, pressure conditions on the piston 27 are equalized and the latter moves downwardly whereby the circuit through the motor M is opened. Instead of thus opening the circuit of motor M, the arrangement may be such that said circuit is opened and closed in quick succession or, alternatively, the resistance characteristics of the motor circuit may be varied as desired to effect change in the motor speed.

Referring to Figs. 7 and 8, there is shown another form of my invention for controlling movement of a tape through a suitable projection field. As illustrated, the tape T passes from the ticker mechanism, not shown, in the direction of the arrows *a*, Figs. 7 and 8, flatwise and in a horizontal direction. It is then so controlled that it passes through the projection field flatwise and in a horizontal direction. However, during passage through said projection field, the tape is in inverted position (upside-down) as regards the manner in which it comes from the ticker mechanism and, therefore, it results that the tape, between the ticker mechanism and the projection field, has a 180 degree twist therein.

As illustrated in Fig. 7, the tape-pulling mechanism is the same as heretofore described in connection with Fig. 1, the longitudinal axes of the rollers 1 and 2 being horizontally disposed whereas in Fig. 1, such axes are vertically disposed. The projection field or projection aperture is indicated at 40, Fig. 7, the projection light beam, as heretofore described but not necessarily, passing through said aperture and the tape section defined thereby, said light beam thereafter coacting with the projection lens 13.

Still referring to Figs. 7 and 8, the aforesaid pulling rollers 1 and 2 are disposed adjacent the exit end of the aperture 40, a member 41 coactable with the tape being positioned adjacent the entrance of said aperture.

The lower end of the member 41, Fig. 8, corresponds in function with the hereinbefore described lever end 31*a*. If desired, said member 41 may be a gravity-controlled weight, a downwardly-biased spring or the like; it coacts with a fixed surface at that side of the tape removed therefrom and, in conjunction with the rollers 1 and 2, causes the tape section in the projection field to have the necessary degree of tautness for projection purposes.

As with the form of my invention shown in Figs. 1, 2 and 3, the longitudinal axis of the projection field 40 is disposed preferably, but not necessarily at right angles to the path taken by the tape as it leaves the ticker mechanism, such path being designated by the arrow *a*, Fig. 7. Further, as illustrated in Fig. 7, the tape passes from the ticker mechanism horizontal, flatwise and with that surface uppermost to which the ink has been applied for forming the printed characters. By the member 41, or equivalent, the inked tape surface is maintained horizontal, flatwise and facing downwardly as the tape enters and passes through the projection field. As a result of the foregoing, the aforesaid 180 degree tape twist exists between the projection field and the ticker mechanism.

As shown particularly in Fig. 8, it results that a tape loop is formed after the tape leaves the ticker mechanism, and the configuration or depth of such tape loop is utilizable, in accordance with my invention, for controlling movement of the tape through the projection field. To this end, there may be utilized vacuum-producing mechanism of the general character hereinbefore described with the exception that a housing H1 is substituted for the housing H of Figs. 1, 2 and 3.

As shown particularly in Fig. 8, the housing H1 comprises or has a wall 42, the exterior surface of which the tape T, to more or less extent, is adapted to engage as it passes toward the projection field 40. The wall 42 has a slot or passage 43 through which, at times, air passes to the chamber 15 of housing H1, the latter having an evacuating conduit 16 connected thereto the same as described in connection with the housing H. Further, it will be obvious from the drawings that the switch mechanism of Fig. 8 controls the motor M of Fig. 7 the same as described in connection with Figs. 1, 2 and 3.

Assuming that a tape loop exists as shown particularly in Fig. 8, it results that the slot 43 is covered by the adjacent tape section. Accordingly, a partial vacuum exists interiorly of the housing H1, the piston 27 is in an upper position, Fig. 8, and the contact members 22 and 23 are closed to cause operation of the motor M. By the latter, the tape T is drawn through the projection field 40 to thereby obtain the desired movement of the tape character images on the screen. This movement of the tapes occurs so long as the aperture 43 remains closed or substantially so or, so long as the tape issues from the ticker mechanism at about the speed of movement thereof under the influence of the motor M.

When operation of the ticker mechanism is discontinued, the motor M continues in operation and, immediately, there occurs a substantial change in configuration of or decrease in depth of the tape loop, Fig. 8. As a result, the tape is drawn from the slot 43 to open the latter and effect discontinuation of tape movement through the projection field 40 the same as heretofore described in connection with Figs. 1, 2 and 3. When this happens, the tape remains stationary in said projection field until after the ticker mechanism has again started to operate; obviously, there is no movement of the tape through the projection field until the ticker mechanism has caused the formation of a loop of proper configuration or sufficient depth to effect closure of the slot 43.

In an arrangement where the tape T is held, as hereinbefore described, in downwardly facing relation at the entrance end of the aperture 40 by a member 41, or equivalent, it results that increase in size of the tape loop results, in a natural way, in increased loop depth in a substantially downward direction, Fig. 8.

Preferably but not necessarily, in accordance with my invention, the control which may be exercised by any given tape section on the motor M occurs before that section, to any substantial extent, has passed into tape loop formation. Accordingly, it is desirable that the aforesaid wall 42 of housing H1 be disposed substantially transversely and beneath the path taken by the tape after leaving the ticker mechanism. Said wall 42 should be curved somewhat as shown in Fig. 8 and the exterior surface thereof should be slightly tilted, with respect to the plane of the paper on which the drawing is made, in a progressive manner for increasing distances from the ticker mechanism. In other words, if it is desired that there shall be operation of the motor M when a tape loop exists as shown in Fig. 8 and if housing H1 is to be positioned as shown, then the configuration of the exterior surface of housing wall 42 should be such that the adjacent section of the tape T, as positioned in Fig. 8, is entirely flush thereagainst, and that said tape section has closed the slot 43. It shall be understood, however, that the housing H1 may be positioned otherwise as desired and that the housing wall 43 may have any other suitable exterior configuration.

An important feature of the various forms of my invention such, for example, as herein disclosed relates to the arrangement whereby a twisted tape loop at or adjacent the entrance to the projection field coacts with a surface having an air passage therethrough to produce variation in the tape movement through the projection field. When the tape is threaded through the projection field before operation of the projection system, the twisted tape loop is formed, and successive sections of the tape pass progressively through the twisted loop formation. In accordance with my invention as herein disclosed, it is some part of the twisted tape loop that opens or closes the aforesaid air passage. This happens because a section of the tape loop or tape section entering into loop formation, when the tape loop increases in size or changes in configuration, inherently moves in the proper direction to close the aforesaid air passage which opens into the vacuum housing, and this movement of the tape section toward the air passage is thus rendered more certain than if the tape had not been twisted. In other words, the tape loop, due to the twist thereof, so controls itself that any increase in size of the loop results in a rather definite and positive thrust of the tape section against the air passage. A twisted tape loop functions more satisfactorily, then, than a tape loop without twist therein because the latter does not inherently have, to such a marked extent, a directional characteristic such as obtains with a twisted tape loop, and any increase in size of a non-twisted tape loop may not function under some circumstances and without other safeguards, to definitely close the air passage.

In the preceding part of this specification, I have referred to the tape T as closing the passages 20 and 43. By this, I mean that the tape restricts the flow of air through said passages sufficiently to cause the development of a partial vacuum in the respective housings H and H1 to cause closure of the circuit through the motor M. In ordinary operation, the tape T does not entirely close either of the aforesaid passages but they are sufficiently throttled from their more open position to cause performance of the operation last described.

In lieu of the herein described members 31, **31*a* and 41**, it shall be understood that any suitable alternative or equivalent arrangement may be utilized as desired.

Although I have described my invention in connection with "through" projection, i. e., projection of that character wherein the projecting light beam passes through a more or less transparent tape section bearing the image-producing characters, it shall be understood that my invention is applicable as well to "reflecting" projection or projection of that character wherein the light beam is reflected by a more or less non-transparent tape section in the projection field at any given time.

Further, it is to be understood that my invention is not to be limited to lamp housings, condenser housings, reflecting systems, etc., of any particular type since my invention is applicable to any suitable type of such arrangements.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a projection system wherein a character-bearing tape passes from ticker mechanism flatwise and with one surface facing in a predetermined direction, the method which comprises supporting said tape for movement through a projection field with said one surface facing in a direction different than said predetermined direction, forming a loop between said ticker mechanism and the projection field whereby a twisted tape loop is disposed adjacent the entrance to said projection field, and controlling movement of said tape through said projection field in response to change in configuration of said tape loop.

2. In a projection system wherein a character-bearing tape passes from ticker mechanism flatwise and with one surface facing in a predetermined direction, the method which comprises supporting said tape for movement through a projection field with said one surface facing in a direction different than said predetermined direction, forming a loop between said ticker mechanism and the projection field whereby a twisted tape loop is disposed adjacent the entrance to said projection field, and effecting movement of said tape through said projection field in response to increase in depth of said tape loop.

3. In a projection system wherein a character-bearing tape passes from ticker mechanism flatwise and with one surface facing in predetermined direction, the method which comprises supporting said tape for movement through a projection field with said one surface facing in a direction different than said predetermined direction, forming a loop between said ticker mechanism and the projection field whereby a twisted tape loop is disposed adjacent the entrance to said projection field, and pulling said tape through said projection field by a device operating in accordance with changes in air pressure effected by change in configuration of said tape loop.

4. In a projection system wherein a character-bearing tape passes flatwise from ticker mechanism, the method which comprises supporting said tape for horizontal movement through a projection field while maintained in vertical edgewise relation, and controlling movement of sad tape through said projection field in response to change in configuration of a tape loop disposed at the entrance to said projection field.

5. In combination, ticker mechanism from which a character-bearing tape passes flatwise and with one surface facing in predetermined direction, means for supporting the tape in a projection field with said one surface facing in a direction different than said one direction, means for pulling the tape through said projection field, there being a twisted tape loop between said projection field and said ticker mechanism which changes in configuration when said tape-pulling means operates non-synchronously with respect to said ticker mechanism, the twist in said tape loop being formed due to the different facing relations of sections of said tape, and means for varying the operation of said tape-pulling means in response to change in configuration of said tape loop.

6. In combination, ticker mechanism, means for supporting the tape ejected therefrom in a projection field, said ticker mechanism and said means being so positioned as to form a twist in the tape therebetween and with a loop at the twisted tape section, means for pulling said tape through said projection field, and means whereby said tape-pulling means is controlled in response to change in configuration of the twisted tape loop.

7. In combination, ticker mechanism from which character-bearing tape passes along a path, means for supporting the tape in a projection field disposed substantially at right angles with respect to said path, said ticker mechanism and said means being so positioned as to form a twist in the tape loop therebetween and with a loop at the twisted tape section, means for pulling said tape through said projection field, and means whereby said tape-pulling means is controlled in response to change in configuration of the twisted tape loop.

8. In combination, ticker mechanism, means for supporting the tape ejected therefrom in a projection field, said ticker mechanism and said means being so positioned as to form a twist in the tape loop therebetween and with a loop at the twisted tape section, means for pulling said tape through said projection field, and means comprising an air chamber for controlling operation of said tape-pulling means, the twisted tape loop controlling the pressure in said air chamber.

9. In combination, ticker mechanism from which character-bearing tape passes along a path, means for supporting the tape in a projection field disposed substantially at right angles with respect to said path, said ticker mechanism and said means being so positioned as to form a twist in the tape loop therebetween and with a loop at the twisted tape section, means for pulling said tape through said projection field, and means comprising an air chamber for controlling operation of said tape-pulling means, a wall of said chamber having a passage for placing the latter in communication with the atmosphere, the twisted tape loop opening and closing said passage to control the pressure in said air chamber.

10. In a projection system wherein a character-bearing tape passes from ticker mechanism flatwise and with one surface facing in a predetermined direction, the method which comprises supporting said tape for movement through a projection field with said one surface maintained in vertical edgewise relation, forming a loop between said ticker mechanism and the projection field whereby a twisted tape loop is disposed adjacent the entrance to said projection field, and controlling movement of said tape through said projection field in response to change in configuration of said tape loop.

11. In combination, ticker mechanism from which a character-bearing tape passes flatwise and with one surface facing in predetermined direction, means for supporting the tape for horizontal movement through a projection field while maintained in vertical edgewise relation, means for pulling the tape through said projection field, there being a twisted tape loop between said projection field and said ticker mechanism which changes in configuration when said tape-pulling means operates non-synchronously with respect to said ticker mechanism, the twist in said tape loop being formed due to the different facing relations of sections of said tape, and means for varying the operation of said tape-pulling means in response to change in configuration of said tape loop.

12. In combination, ticker mechanism from which a character-bearing tape passes flatwise and with one surface facing in predetermined direction, means for supporting the tape in a projection field with said one surface facing in a direction different than said one direction, means for pulling the tape through said projection field, there being a twisted tape loop between said projection field and said ticker mechanism which changes in configuration when said tape-pulling means operates non-synchronously with respect to said ticker mechanism, the twist in said tape loop being formed due to the different facing relations of sections of said tape, and means for varying the operation of said tape-pulling means in response to change in configuration of said tape loop, said last named means comprising a suction housing having a surface conformable in configuration with that of the adjacent section of the tape loop.

13. In combination, ticker mechanism from which a character-bearing tape passes flatwise and with one surface facing in predetermined direction, means for supporting the tape for horizontal movement through a projection field while maintained in vertical edgewise relation, means for pulling the tape through said projection field, there being a twisted tape loop between said projection field and said ticker mechanism which changes in configuration when said tape-pulling means operates non-synchronously with respect to said ticker mechanism, the twist in said tape loop being formed due to the different facing relations of sections of said tape, and means for varying the operation of said tape-pulling means in response to change in configuration of said tape loop, said last named means comprising a suction housing having a surface conformable in configuration with that of the adjacent section of the tape loop.

14. In a projection system, a motor for pulling a character-bearing tape through a projection field, and suction-control mechanism for varying the operation of said motor in accordance with change in configuration of a tape loop at the entrance to said projection field, said mechanism comprising a housing having a suction port adapted to be more or less covered by an adjacent section of the tape loop, means for withdrawing air from said housing, a cylinder, a conduit connecting said housing and cylinder, and a piston movable in said cylinder in response to change in coverage of said suction port by the adjacent tape section, said piston controlling the circuit of said motor.

15. In a projection system, a motor for pulling a character-bearing tape through a projection field, and suction-control mechanism for varying the operation of said motor in accordance with change in configuration of a tape loop at the entrance to said projection field, said mechanism comprising a housing having a suction port adapted to be more or less covered by an adjacent section of the tape loop, means for withdrawing air from said housing, a cylinder, a conduit connecting said housing and cylinder, and a piston movable in said cylinder in response to change in coverage of said suction port by the adjacent tape section, said piston carrying an electrical contact member for opening and closing the circuit of said motor.

16. In combination, ticker mechanism comprising means for passing a character-bearing tape therefrom while disposed flatwise, means for supporting the tape in a projection field in vertical edgewise relation, said ticker mechanism and said supporting means being so positioned as to form a twist in the tape therebetween and with a loop at the twisted tape section, means for pulling said tape horizontally through said projection field while said tape is maintained in said vertical edgewise relation, and means whereby said tape-pulling means is controlled in response to change in configuration of the twisted tape loop.

KENNETH L. CURTIS.